C. T. GRIMES.
Plow.
No. 81,996.
Patented Sept. 8, 1868.
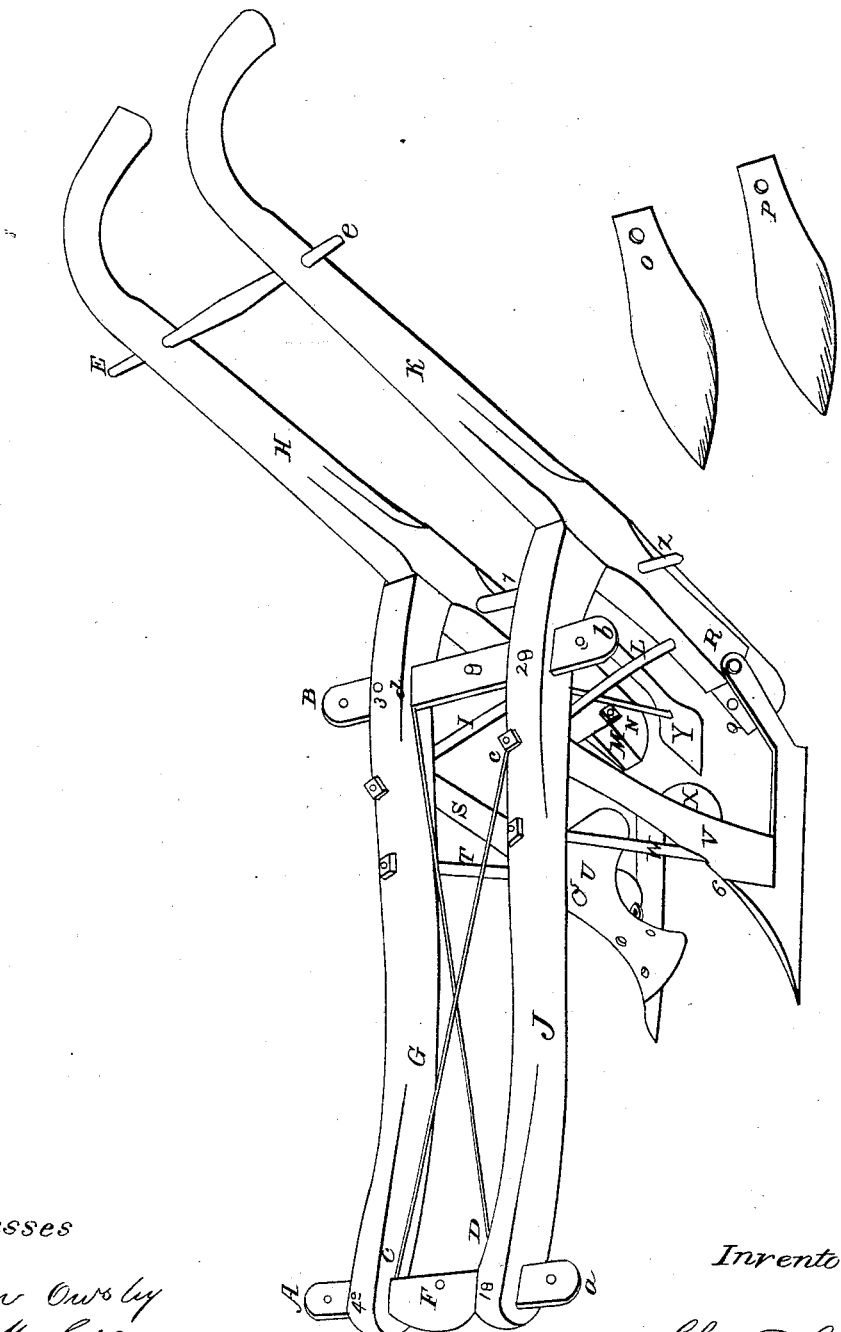
Witnesses
John Owsley
M. M. Gile
Inventor
Chas. T. Grimes

United States Patent Office.

CHARLES T. GRIMES, OF GARRARD COUNTY, KENTUCKY.

Letters Patent No. 81,996, dated September 8, 1868.

IMPROVEMENT IN PLOWS.

The Schedule referred to in these Letters Patent and making part of the same.

TO ALL WHOM IT MAY CONCERN:

Be it known that I, CHARLES T. GRIMES, of the county of Garrard, and the State of Kentucky, have invented a new and improved combined plow, and known as "C. T. Grimes's Combined Plow," for the purposes of making and preparing ridges for planting cotton, corn, and such like vegetation, for opening the ridges, for the purpose of gathering such products as may be planted or sown in rows or ridges; and I do hereby declare that the following is a full and exact description thereof, reference being had to the accompanying drawings, and to the letters of reference marked thereon.

The principle of my invention consists in so combining two distinct plows with one handle, each by means of two cross-bars A $a$ and B $b$, and the rods C $c$ and D $d$, and rod E $e$, as shown in the accompanying drawing, that they may be used at the same time, by one person, and drawn by two horses, hitched by means of double-trees to the cross-bar A $a$, at its centre, F.

To enable others skilled in the art to make and use my invention, I will proceed to describe its construction and operation.

I make beam G and handle H of timber, and connect them by means of an iron rod, I, and the beam J and handle K of timber, and connect them by means of an iron rod, L, and connect the beam by means of cross-bars A $a$ B $b$, made of timber, rods C $c$ D $d$ made of iron, and E $e$ made of timber. Fasten shovel-plow O on handle H, at M, with screw-bolt N, and fasten shovel-plow P on handle K, at Q, with screw-bolt R; and I have two shovel-plows so connected that one man, with two horses hitched at F, by means of double-trees, may plow both sides of a row of corn, or cotton, or other products planted in rows or ridges at one and the same time, one horse walking on the left, and the other on the right of the row. The plow thus connected may be so altered as to make them plow nearer to or farther from the row, by moving the two beams nearer to or farther from the centre of cross-bars A $a$ and B $b$, and making them secure, when thus moved by iron bolts 1 2 3 4, and may be used, when placed at a proper distance, for checking land for planting corn and such other products as are planted in checks.

I make the helve S of timber, and connect it to beam G, at its upper end, by a mortise, and make them secure together by means of iron rod T, and to handle H with screw-bolt N, then make V of timber, connect it with beam J, by mortise, at its upper end, and make it secure to beam J, with iron rod W, and fasten mould-board plow X, turning right to helve V, by means of screw-bolt 6, and hook at lower end of rod W and to handle K, with screw-bolt R, with the left-turning plow on the right end of cross-bars A $a$ and B $b$, and the right-turning plow on the left end of said bar.

I have two small turning-plows, so adjusted that one man, with two horses, can make a complete ridge, narrower or wider, by moving the beams to or from the centres of the said cross-bars, as above described. I then connect the spoonbill-plow Y, at its upper end, to the centre of cross-rod of timber Z, with screw-bolt 7, and connect said spoonbill to centre of cross-bar B $b$, by means of iron rod 8, which rod has one screw-tap above and one below cross-bar B $b$, to lower or raise the point of the spoonbill. With the spoonbill-plow Y thus connected, the ridge, made as above stated, may be opened for the reception of seeds at the time it is made.

The position of the turning-plows may be so altered as to throw the earth from the centre by putting beam G and handle H, with left-turning plow $u$, on the left end of cross-bars A $a$ and B $b$, and beam J and handle K with the right-turning plow X, on the right end of said bars, remove the spoonbill and draw the beams very close together.

What I claim as my invention, and desire to secure by Letters Patent, is—

1. The modes of making handles H and K, and so arranging them on beams G and J, that they may be used as handles for two turning-plows, and as helves for two shovel-plows, when the turning-plows and helves V and S, and rods T and W are removed.

2. Also, the mode of combining the handles H and K, and beams G and J, by means of cross-bars A $a$ and B $b$, and rods C $c$ and D $d$, and rods E $e$ and Z $z$, so that the two plows are used by one person.

CHARLES T. GRIMES.

Witnesses:
   H. T. NOEL,
   W. L. BURDETT.